Oct. 10, 1933.   A. C. FORSTER   1,929,842
APPARATUS FOR THE MANUFACTURE OF GLASS CONTAINERS
Filed April 19, 1930
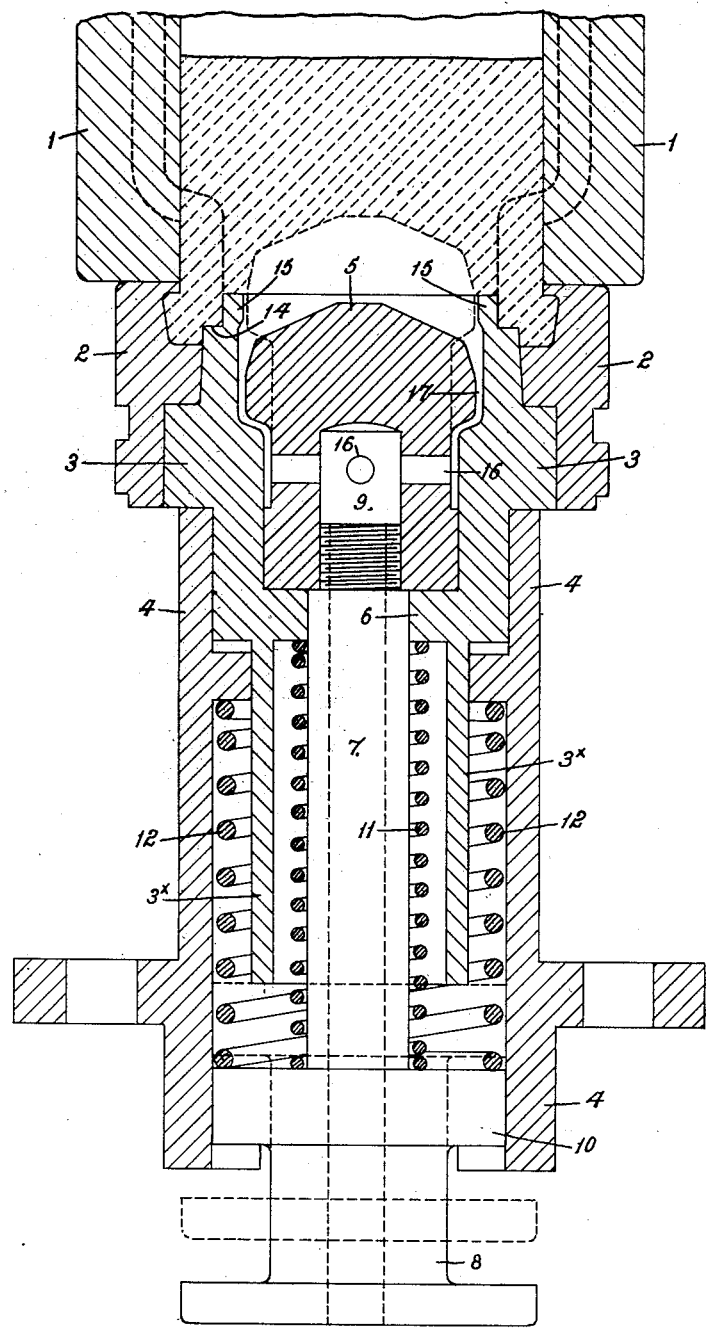

Patented Oct. 10, 1933

1,929,842

UNITED STATES PATENT OFFICE 1,929,842

APPARATUS FOR THE MANUFACTURE OF GLASS CONTAINERS

Arthur Clarence Forster, Knowsley, England

Application April 19, 1930, Serial No. 445,778, and in Great Britain May 27, 1929

6 Claims. (Cl. 49—18)

This invention has reference to the manufacture of glass containers, such for instance those used for holding food stuffs, and other perishable substances, whether in solid, plastic or liquid form.

In the case of glass jars, usually the mouths of such containers are nearly as large as the body, whilst in the case of bottles, say for holding milk and other perishable liquids, the mouth is relatively small.

In the manufacture of containers of the kind concerned, where a closed and airtight joint is to be made between a closure device and a seat or ledge round the inside of the mouth, it has been found very difficult to provide an even and true ledge or seat which is to form the packing seat between the closure, lid or the like, and the container, a ring or washer being generally used as a packing or joint making medium; and the primary object and effect of the present invention is to overcome these difficulties or defects, and to produce a ledge or seat which is true and even or smooth, so that an airtight joint with the packing or sealing medium can be easily produced by pressure, and especially the pressure of the outside atmosphere which serves to preserve a closure in cases where the interior of the container is evacuated.

In the method and means of manufacture of containers of the kind concerned hereinafter described, the improvements under this invention are comprised.

In the manufacture of glass containers in moulds by air pressure, as stated, it has been found difficult to form a ledge or seat round the inside of the mouth which is true and even, and one of the difficulties has been in attempting to form this ledge or seat, it has not been commercially possible to prevent its being blown away or damaged by the air forced into the glass in blowing it within the mould, but by this invention and process this defect has been overcome.

In this method of and mechanism for the manufacture of these containers, in the making of the container, that is in forming or casting the mouth or neck portion, two annular seats or ledges are formed, at different levels, one below the other; and in connection with their production a sleeve mould part is used having two annular steps, the outer one being for forming the ledge which is to form the seal or joint seat, and the other is to form a second ledge which, however, in the manufacture and blowing operation, will be forced or pressed away, so that it will not or hardly exist as a ledge in the completely blown and formed container.

The double stepped sleeve is disposed outside the blowing plug of the mould.

The moulds may be of the usual kind, such as those having a ring mould, and a parison mould; and the molten metal is introduced into the mould from the opposite end to that in which the container mouth or neck is formed; and this opposite end is closed by a cover, and constitutes a "blow down"; and the air forced in through this head forces the glass onto the ring mould and onto the annular step parts of the sleeve, and on to the plug; and subsequently the plug falls back a small distance, and air is admitted round the plug, and it acts on the glass above the inner annular step and the glass is blown back. That is the air forces the glass back for the whole length of the parison mould, and also forces the glass which forms the temporary inner annular ledge referred to, almost or completely away, as the bulk of the strain of stretching the glass comes on to this lower and inner ledge.

By this method of making the mouth or neck portion of a glass container, and form of mould the real seat or seal rim or ledge is protected or preserved intact, and truth or evenness of surface in all respects completely accomplished, so that it forms a true and even surface or seat on which the sealing or airtight joint ring rests.

These special formations of the mouth or neck of the container, will be formed in the ring moulds.

The drawing hereto annexed, illustrates the method of and means for manufacturing glass containers of the character above described, but the invention as stated can also be carried out by pneumatic system of blowing or manufacture by the vacuum method.

Referring now to the drawing, 1 is the usual parison mould, 2 is the outer ring mould in which the neck of the container is formed, and which, as usual is made in sections, so as to enable the container to be removed after manufacture. 3 is the inner or sleeve mould by which the seal or joint seat of the neck, on which the airtight joint making material rests, is formed.

This sleeve moulding part extends down in the form of a cylinder $3^x$, and lies within the casing or cylinder 4 of the apparatus.

5 is the plug, fitting within the inner ring mould 3, which operates in connection with the sleeve mould and the molten metal, and the base of which normally rests on the inwardly projecting flange 6 of the sleeve.

7 is a tubular spindle mounted upon the movable part 8 below, and screwing at its upper end into the lower part of the plug, and above which spindle is a chamber 9; and 10 is a flange on the part 8 fitting in the lower open end of the casing 4, and on this flange the inner and outer springs 11 and 12 rest, and normally press these parts and the plunger 5 down into their lower position.

With regard to the annular face or seat of the sleeve mould 3 for making the sealing seat in the mouth of the container, this is designated 14, and above and within it is the internal annular shielding part 15, and these parts form the top of the mould into two annular steps, namely, the annular surface 14, and the upper annular edge surface of the shielding part 15.

Air is supplied to the upper part of the interior of the mould through the tube 7 by way of the chamber 9, ports 16, and the annular spaces 17 between the plug body and the inner wall of the sleeve mould.

In operation, the quantity of metal required—indicated by the dotted shade part—to make the container is introduced into the apparatus from above in the usual way, the plug 5 being then in the uppermost position as shown by the dotted lines in the drawing; and then compressed air is supplied in the usual way to the upper part of the parison mould, and it forces it down into the lower part of the mould over the plug and down into the space between the sides of the plug and the moulds 1 and 2, and into the spaces between the lower part of the parison mould and between the sleeve and ring moulds, and on to the annular seat forming and seat protecting parts 14, 15. The mouth portion of the container, as shown in the drawing, is thus formed.

It will be seen in this connection that the bottom of the annular chamber of the ring mould lies below the level of the seat forming annular ledge 14, and that the upper part of the ring projects inwardly as a short flange; and the glass is forced into and fills this annular chamber. By this formation of mould the container neck or head will have an annular flange projecting out above the joint or seal formed by the annular step 14.

When the metal has thus been pressed down, the plug 5 is slightly lowered, and compressed air is admitted through the tube 7, chamber 9, ports 16 and 17, and as it flows upwards, it acts on the metal forming the inwardly projecting part of the metal existing above the upper end of the shielding part 15, and forces it back into the body of glass; so that this portion of the metal within the neck of the container directly or vertically above the upper surface of the shielding part 15 is blown away; while at the same time the metal above the annular surface 14 is protected from damage by the action of the air by the shielding part 15, and so the truth of the surface formed by the annular surface 14 is not disturbed or affected, and remains smooth or even and true.

The air supplied to force the glass up into the parison mould, begins to be supplied as the plug 5 recedes, so that an annular stream of air is supplied between the mould shielding part 15 and the side of the plug, and the blowing away of the glass above the upper surface of the shielding part 15, is assisted by making the shielding part 15 to project inwards a slight amount as shown by the drawing, and by making the sides of the upper part of the plug slightly conical as indicated.

The inwardly projecting part of the glass above the shielding part 15 is taken up more or less by the stretching of the metal which takes place in blowing back the charge into the parison mould.

The body of metal in the mould is forced into the parison in the usual way; and the container is finished in the finishing mould, as usual.

While the invention has been described as carried out by pneumatic pressure where the air is above the pressure of the atmosphere, that is by compressed air, it is to be stated that it can be carried out where the air employed is at a minus pressure.

Preferably the annular ledge 14 of the sleeve mould projects upwards from its inner angle, so as to give the annular joint or seat face of the container a slightly upwardly inclined or projecting form from its inner angle, and this tends to the better making and retaining of an airtight joint.

What is claimed is:

1. In a moulding apparatus for forming true-seats in pneumatically formed glass containers, the said true-seats being adapted to cooperate with the joint making closures for the finished containers, a container neck-shaping apparatus comprising in combination a neck ring for shaping the exterior of the neck, and a sleeve within the said neck ring and having a true-seat-forming part extending inward from the exterior surface of the sleeve, whereby a true-seat is formed within the neck of the container, and a shielding-part projecting in the direction of the axis of the mould beyond the said true-seat forming part, whereby the neck of the container immediately beyond the said seat forming surface is shielded from the blast of air flowing into and through the container neck during blowing of a parison.

2. In a moulding apparatus for forming true-seats, for joint-making closures in pneumatically formed glass containers, a neck ring, a sleeve within same having an annular surface part extending inward from its outer surface adapted to form the true-seat within the neck of the container, and a cylindrical part projecting in the direction of the axis of the mould and beyond the said annular surface, whereby the portion of the glass immediately beyond the part forming the true-seat, is shielded from the blast of air flowing into and through the neck of the container during the blowing of the parison.

3. In a moulding apparatus for forming true-seats in pneumatically formed glass containers, the said true-seats being adapted to cooperate with the joint making closures for the finished containers, a container neck-shaping apparatus comprising in combination a neck ring for shaping the exterior of the neck, and a sleeve within the said neck ring and having a true-seat-forming part extending inward and downward from the exterior surface of the sleeve, whereby an inclined true-seat is formed within the neck of the container, and a shielding-part projecting in the direction of the axis of the mould beyond the said true-seat forming part, whereby the neck of the container immediately beyond the said seat forming surface is shielded from the blast of air flowing into and through the container neck during blowing of a parison.

4. In a moulding apparatus for forming true-seats for joint making closures in pneumatically formed glass containers, a neck ring, a sleeve within same having an annular surface part extending inward from its outer surface adapted to form the true-seat within the neck of the container, and a cylindrical part projecting in the direction of the axis of the mould and beyond the said annular surface, whereby the portion of the glass immediately beyond the part forming the true seat is shielded from the blast of air flowing into and through the neck of the container during the blowing of the parison, the said cylindrical projecting part being in the form of a ledge against which the glass introduced into the parison mould comes in the blowing action of forming the container neck.

5. A moulding apparatus as defined in claim 1, wherein the true-seat forming part of the sleeve mould consists of two annular faces at a spaced distance apart, in the direction of the axes of the mould, one within the other in the radial direction, adapted to form two separate faces in the neck of the container, whereby the air using for blowing the article is caused to impinge upon and remove the inner of the said faces.

6. In a moulding apparatus for forming true-seats for joint making closures in pneumatically formed glass containers; a parison mould, a ring mould, an inner sleeve mould, an outer casing within which the lower part of the sleeve mould is carried, an annular true-seat forming part on the sleeve and within it a cylindrical ring extending axially beyond the seat forming part, and forming an area onto which the glass is forced when introduced into the parison mould when the neck is formed.

A. C. FORSTER.